Oct. 21, 1969   M. H. ALLEN, JR   3,473,381
ELECTRIC POSITION SENSOR WITH SWITCH LOCATOR
Filed Nov. 24, 1967   2 Sheets-Sheet 1
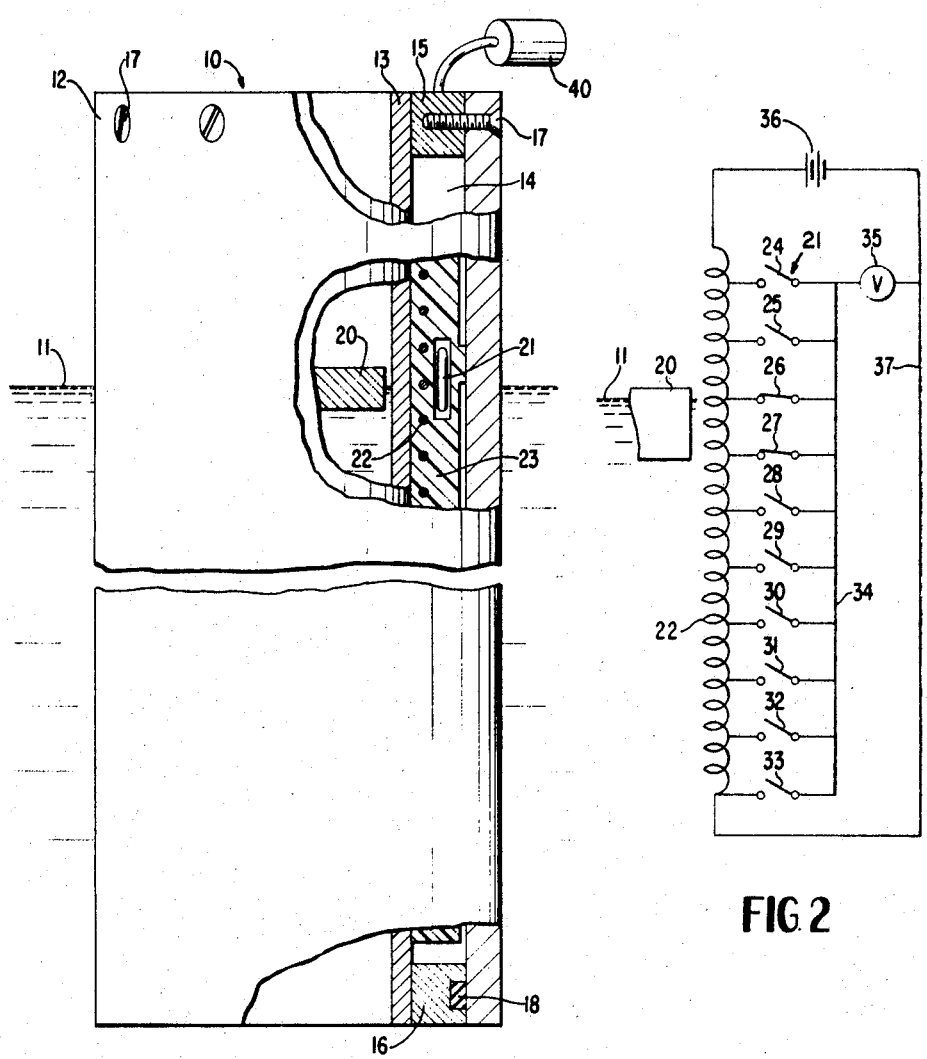
INVENTOR
MALCOLM H. ALLEN, JR
BY George A. Herbster
ATTORNEY Oct. 21, 1969　　　M. H. ALLEN, JR　　　3,473,381
ELECTRIC POSITION SENSOR WITH SWITCH LOCATOR
Filed Nov. 24, 1967　　　　　　　　　　2 Sheets-Sheet 2

INVENTOR
MALCOLM H. ALLEN, JR

BY George A. Herbster
ATTORNEY

United States Patent Office 3,473,381
Patented Oct. 21, 1969

3,473,381
ELECTRIC POSITION SENSOR WITH SWITCH LOCATOR
Malcolm H. Allen, Jr., Melrose, Mass., assignor to General Electric Company, a corporation of New York
Filed Nov. 24, 1967, Ser. No. 685,390
Int. Cl. H01h 35/18, 1/66
U.S. Cl. 73—313      11 Claims

ABSTRACT OF THE DISCLOSURE

A switch locator for an electric, magnetically operated position sensor. Apertured, juxtaposed strips axially disposed on a tubular core member physically position magnetically actuated reed switches on one side of the tubular member. When a magnet moves axially along the tubular member, the switches are operated sequentially as if they were helically disposed about the tubular core member.

Background of the invention

This invention is directed to electric position sensors with switched resistance means and more particularly to a switch locating means for such sensors.

In recent years it has become important to provide accurate fuel measurement, especially in aircraft fuel tanks. Several liquid level sensors have been developed for immersion in the tanks to provide an electrical output indicating either the level or quantity of the fuel in the tank. In one such sensor magnetic reed switches and a resistance coil encapsulated in an electrical insulating material provide the electrical output. Such a sensor is claimed in Ser. No. 639,469, filed May 18, 1967, Trekell et al. and assigned to the same assignee as the present invention.

Initially switches in these sensors were located in an apertured sheet which partially circumferentially surrounded a tubular core member over the entire length thereof. However, when such an assembly was subjected to the thermally variable environment encountered in measuring high temperature fuels, the insulating material, which had a greater coefficient of thermal expansion than the tubular core member, produced excessive differential expansion.

Metallic switch locators with the same coefficient of thermal expansion as the tubular core member were tried. As each sheet was necessarily thinner than the switches it supported to provide flexibility, many switches were broken during manufacture and subsequent use. Insulation of the switch locator and proper dressing of switch leads to prevent short circuits were required. Hence, a two-fold manufacturing problem existed.

Therefore, it is an object of this invention to provide an electrical position sensor adapted for use in thermally variable environments.

Another object of this invention is to provide an electric position sensor wherein switch breakage is substantially eliminated.

Still another object of this invention is to provide an electric position sensor whch facilitates manufacture.

Yet another object of this invention is to provide an electric position sensor including a switch locator which facilitates the positioning of electrical leads.

Summary

In accordance with one aspect of this invention a plurality of sequentially operated, position sensitive switches are disposed to operate as if they were in a given axial pattern. A plurality of spaced, juxtaposed, apertured flexible strips are arranged to partially surround a tubular member to support the switches and substantially eliminate excessive differential thermal expansion.

This invention has been pointed out with particularity in the appended claims. The above and further objects and advantages of this invention may be better understood by referring to the following detailed description taken in conjunction with the accompanying drawings.

Brief description of the drawings

FIGURE 1 presents a pictorial illustration of an electric position sensor formed in accordance with this invention having certain portions broken away to show some detail;

FIGURE 2 presents a schematic diagram of a switching network adapted for use in an electric position sensor constructed in accordance with this invention;

Description of the preferred embodiment

Figure 3:
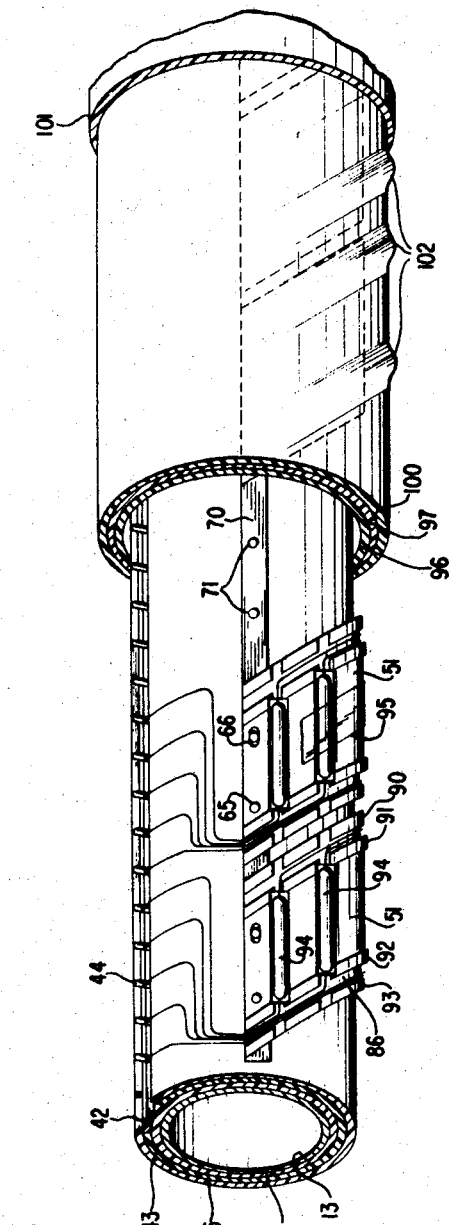
FIGURE 3 is a detailed drawing to illustrate a completed electric position sensor constructed in accordance with this invention.

FIGURE 1 shows one embodiment of an electric position sensor. A liquid level sensor 10 adapted for immersion in a liquid 11 has an outer annular housing 12 and an inner annular housing or core 13 spaced from the outer housing 12 to form an annular space 14. The housings are located by annular flanges 15 and 16 at either end of the liquid level sensor 10; and the two housings are joined by fastening means. For example machine bolts 17 are tapped into the upper annular flange 15 which is welded or otherwise affixed to core 13. The lower annular flange 16, also attached to the core 13, has a circumferentially extending slot formed therein to hold an O-ring 18 or other spacing device. The O-ring 18 centers the core 13 with reference to the outer housing 12 and also tends to dampen the vibration between the two elements.

A magnet float 20, disposed in the bore of the core 13, is positioned longitudinally along the bore in response to the level of the liquid 11. The magnetic field emanating from the magnet float 20 is coupled through the core 13 to switching means 21 disposed along the length of the core 13 and connected to a resistance, shown as a tapped resistance coil 22 also disposed along the length of the core 13. Both elements are encapsulated in an insulating medium 23 which is defined in detail hereinafter.

The switching means 21, the resistance coil 22 and the magnet float 20 are schematically illustrated in one configuration in FIGURE 2. A plurality of switches 24 through 33 are connected between taps on the resistance coil 22 and a common conductor 34. Magnetic reed switches are particularly adapted to this application because they have a long operational life and also because they are hermetically sealed. As a megnetic float 20 moves along the coil 22 in response to the level of the liquid 11, the switches adjacent to the magnet float 20 are closed. For example, in FIGURE 2, switches 26 and 27 are closed.

Therefore, this construction resembles a potentiometer wherein the resistance coil 22 constitutes the resistance element and the common conductor 34 together with switches constitute the slider. The voltage at the common conductor 34 can then be measured by a voltmeter 35 if the resistance coil 22 is energized by a power supply such as a battery 36 connected between one side of the coil 22 and a conductor 37 from the other side of the resistance coil 22. Such a voltmeter could be connected to measure the voltage between the conductors 34 and 37. When this arrangement is used, the volmeter 35 registers a voltage proportional to level. If the taps on the resistance coil 22 are properly located, liquid quantity readings are obtained.

Alternatively, the voltage between the conductors 34 and 37 could be used as an output signal and taken from the sensor 10 by terminal means 40 shown in FIGURE 1 in lieu of or in addition to the indication provided by the voltmeter 35 in FIGURE 2. Where current indications are required, the system could easily be converted to provide a current output by using the switches to short circuit sections of the resistance coil 22 while energizing the circuit with a constant voltage source. Another possible switching scheme is shown in Patent 3,200,645, Levins, issued Aug. 17, 1965 and assigned to the same assignee as the present invention.

Referring now to FIGURE 3 a liquid level sensor constructed in accordance with the invention includes the core 13 shown as a right cylinder in the horizontal position. Wrapped about the core 13 is a composite insulating film material which may be constituted by a central polyimide film and outer layers of a fluorinated ethylene propylene thermoplastic polymer which is compatible with the polyimide film. Such a construction is disclosed and claimed in the above-mentioned Trekell et al. application. Suffice it to say that a first insulating layer 41 is constructed by distinct layers of a polyimide film and a thermoplastic polymer. Disposed over a portion of this first insulating layer 41 is a nonthermoplastic polymer bridge 42 formed of a material such as a fluorinated polyethylene polymer and a layer 43 of a thermoplastic film which partially encircles the wrapped core. A coil 44 of resistance wire is helically wrapped along the length of the liquid level sensor over both the first insulating layer 41 and the bridge 42 and under the layer 43 so that small gaps are present between adjacent turns of the resistance coil 44 and the first insulating layer 41. Another layer 45 of a polyimide thermoplastic composite film may be formed coextensively with the insulating layer 43.

Figure 4:
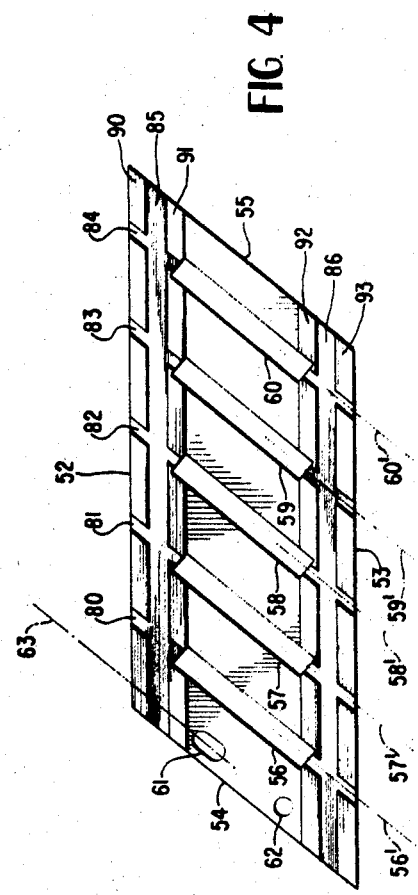
FIGURE 4 is a detailed view of a switch locator constructed in accordance with this invention.

After this subassembly has been fired to cause bonding of the material, switch locators 51 having a plurality of apertures formed therein are affixed to the tubular core member constituted by the wrapped insulated core 13. Details of such a switch locator are shown in FIGURE 4.

Such a switch locator is preferably formed of T.F.E. Teflon with parallel sides 52 and 53 parallel sides 54 and 55 in the form of a parallelogram. Teflon is the trade name of Du Pont for its line of fluorocarbon resins. T.F.E. Teflon is a high-viscosity tetra fluoro ethylene resin which is characterized by the fact that above 620° F. it turns to a rubber gell rather than to a fluid. Thus, applying heat to T.F.E. does not, unlike the usual thermoplastic polymers, convert it to the fluid state. Other forms of fluorocarbon resins marketed by Du Pont under its Teflon designation, on the other hand, are thermoplastic in the usual sense. For example, the fluorinated etheylene propylene referred to above and sold as F.E.T. Teflon is such a thermoplastic fluorocarbon. The angle defined by the intersecting sides is generally the pitch angle of a desired helical switch pattern for the sensor. Assuming that ten switches are to be located in one revolution of a desired helix, five elongated apertures designated by numerals 56 through 60, are formed in the locator 51. Each aperture is elongated along an aperture axis designated by numerals 56' through 60' respectively. When the locator strip is flat, the axes 56' through 60' are substantially parallel with the sides 54 and 55. A locator slot 61 and a locator hole 62, formed through the locator 51, lie on a common axis 63 which is also parallel with the axes 56' through 60'.

If the switch locator 51 is disposed on the tubular member so that the axis 63 is parallel to a longitudinal axis of a tubular member, the axes 56' through 60' are, by definition, individually parallel with the axis. The sides 52 and 53 and each point common to an aperture will, when locator is bent around the circumference of the tubular member, lie on a helix of the desired pitch angle.

To facilitate positioning, a metallic strip 70 is disposed longitudinally along the tubular member and is formed of the same material as the core. For example the core 13 and the longitudinal strip 70 in FIGURE 3 could both be formed of aluminum. A plurality of protuberances are formed along the length of the longitudinal strip 70. These protuberances are grouped in pairs 71 which are matingly engageable with slots and holes 65 and 66 respectively in each locator strip 51. Alternate pairs of the protuberances are spaced along the longitudinal strip 70 at the distance described by one revolution of the helix. Adjacent pairs are likewise spaced. Therefore, if a constant pitch helix were to be used, each pair would be equidistantly spaced from an adjacent pair.

The spacing of the protuberance pairs 71 and the length of the sides 54 and 55 on locator strip 51 are chosen so that the juxtaposed strips are slightly spaced. When the entire assembly shown in FIGURE 3 is then subjected to large temperature variations, expansion of each strip locator 51 is incremental. The net effect is that the switch positions remain relatively constant with respect to the core member 13.

Referring again to FIGURE 4 a plurality of parallel and intersecting channels are formed in the locator strip. Parallel channels 80 through 84 are extensions of the apertures 56 through 60 along the axes 56' through 60' respectively. A pair of parallel main channels 85 and 86 extend along the length of the locator 51 and intersect the channels 80 through 84. These channels serve two purposes. First they are lead channels for switch leads and other electrical conductors. Secondly, by forming these channels in the switch locator 51, it is possible to increase the body thickness of the locator without a loss of flexibility. Adjacent the switches the locator thickness is maintained equal to or greater than the reed switch diameter. During manufacture or use, the locator 51 thereby protects the switches to substantially eliminate breakage.

Another feature of the switch locator 51 shown in FIGURE 4 is the formation of four parallel ridges 90, 91, 92 and 93 transverse the aperture axes 56' to 60' which define the channels. These ridges are parallel to the sides 52 and 53 and are divided into two pairs. The function of these ridges may be better understood in relation to the final construction of a liquid level sensor by again referring to FIGURE 3.

In accordance with this invention the positioner strip 70 is disposed along the length of the member and includes pairs of protuberances 71 which are individually spaced to mate with the slots and apertures 65 and 66 respectively associated with each locator 51. In this particular embodiment, adjacent protuberance pairs 71 are equidistantly spaced and longitudinal distance therebetween is equal to the longitudinal displacement of one revolution of the helix.

A plurality of the switch locators 51 are disposed along the length of the probe and engage the strip 70. Due to the flexible nature of the locators 51, they are bent to be contiguous with the probe. In this configuration the apertures are oriented so that a longitudinal axis through each of the apertures is parallel to the longitudinal axis of the core 13. Furthermore, the apertures are disposed along the core 13 to define the helix.

Switches designated by numeral 94 are individually disposed in each switch locator aperture. One set of leads from a set of switches in a given switch locator 51 may individually be dressed through one of the slots 80 through 84 extending from the aperture to one main channel 86 and thence to the resistance coil 44 where it is affixed to a predetermined tap. The other switch leads are dressed through the oppositely extending portions of the channels 80 through 84 to a common conductor.

The juxtaposed arrangement of the switch locators 51 permits each locator to expand individually and incrementally so the expansion is taken up by the space between the adjacent switch locators. As all the switches are located on approximately one-half the circumference of the tubular support, manufacture is facilitated because the leads are easily affixed to the resistance coil 44. Although physically positioned on one side, the switches are sequentially operated as if they were displaced along the length of the probe in a helical pattern. In the illustrated particular embodiment an overlapping helical pattern having a constant pitch angle is described. Alternate switch locators and their switches form one portion of each helical revolution while the adjacent switch locators form the complementary portion.

For further assembly a tape 95 formed of a nonthermoplastic polymer is wrapped over the switch locators 51 to hold them in position along the length of the tube. Then the entire assembly is wrapped with thermoplastic film 96. As the film 96 is generally substantially transparent, it is possible to modify the arrangement of the individual switch locators 51 and also to finally dress the switches and leads along the length of the sensor. Additional insulating layers of a thermoplastic polymer 97 and the composite polyimide thermoplastic film 100 may then be applied along the entire length of the unit, so that a completely encapsulated probe results.

If it is necessary to further space the assembled sensor from the outer housing 12 in FIGURE 1, a bumper 101 can be formed thereon by circularly wrapping the composite film 100 to the proper radius and then continuing to wrap the tape along the sensor. Normally, spacing is provided in part by the ridges 91 and 92 formed on the individual locators which are slightly higher than the ridges 90 and 93. After the wrapping, these ridges cause smooth bumps 102 to be formed for spacing.

After the composite film is finally wrapped along the entire length, the sensor is again subjected to a heat treatment of a temperature and a duration sufficient to cause all layers of the thermoplastic polymer to melt and flow. After this operation the liquid level sensor can be inserted into the outer housing 12 and affixed thereto.

Forming a liquid level sensor probe in accordance with this invention provides good insulation for the electrical network disposed along the sensor length. By utilizing individual flexible insulating strips to locate the switches, probelms previously encountered in differential thermal expansion are substantially eliminated. When a channeled, nonthermoplastic material, such as T.F.E. Teflon, forms the switch locators, the switches are protected from breakage during manufacture. Furthermore, leads may be dressed and recessed in the channels to afford a smooth overall sensor appearance, interrupted only by spacer bumps formed by overwrapping the ridges on the switch locators.

Therefore, in accordance with this invention a highly reliable, accurate liquid level sensor is provided. Although only a single embodiment is shown herein, it will be obvious to those of ordinary skill in the art that material changes and different arrangements may be practiced without departing from the true spirit and scope of this invention.

What is claimed as new and desired to be secured by Letters Patent of the United States is:

1. In an electric position sensor including an axially extending, insulated tubular member, tapped resistance means disposed on the tubular member, means for electrically energizing the resistance means, a common conductor, and switching means including an axially displaceable switch actuator and a plurality of switches to be sequentially operated in response to displacement of the switch actuator, the switches being individually connected between the common conductor and the resistance taps, the improvement consisting of switch locator means for positioning the switches to partially surround the tubular member in an axial pattern comprising:

(a) a plurality of axially juxtaposed, flexible strips partially surrounding the tubular member at an angle with the axis of said tubular member such that the longitudinal axis of the strip is skewed with respect to the tube axis, each of said strips having slots cut therein to define a plurality of spaced, parallel switch apertures adapted to receive and position the switches, adjacent apertures in each of said strips being axially offset to position the switches according to the axial pattern, and (b) means for securing said strips to the tubular member for maintaining the juxtaposed relationship of said strips.

2. An electric position sensor as recited in claim 1 wherein the switches are to extend in a helical pattern, the switch apertures in each of the said strips being spaced circumferentially about a portion of said tubular member and axially displaced with respect to each other thereby individually orienting the switches along axes parallel to the tubular member axis, said strip securing means supporting said strips so that the locus of common points in the switch apertures for all said strips lies on the helical pattern.

3. An electric position sensor as recited in claim 2 adapted for use in a thermally variable environment wherein the tubular member has a given coefficient of thermal expansion, said strip securing means including an elongated, thin member for maintaining the juxtaposed relationship being composed of a material having the given coefficient of thermal expansion.

4. An electric position sensor as recited in claim 3 wherein the insulated tubular member includes an aluminum core, said elongated thin member being composed of aluminum.

5. An electric position sensor as recited in claim 3, said flexible strips being formed of a nonthermoplastic fluorocarbon polymer known as T.F.E. Teflon.

6. An electric position sensor as recited in claim 2, each of said strips having a plurality of locating means at one end thereof lying on an axis parallel to the switch axes and said strip securing means including an elongated thin member having equidistantly spaced locating means engageable with said strip locating means to provide a constant pitch helix.

7. An electric position sensor as recited in claim 6, said strip locating means being constituted by a pair of locating apertures formed therethrough and said strip securing means locating means being constituted by a pair of protuberances engageable with the locating apertures.

8. An electric position sensor as recited in claim 6, said strips being formed so that the switch apertures are partially axially coextensive, said strips thereby locating the switches in an overlapping helical pattern.

9. An electric position sensor as recited in claim 2 adapted to be encapsulated in an insulating medium and to be inserted in a housing, said strips having a plurality of ridges formed thereon transverse to the switch locating apertures, said ridges producing spacing projections for spacing the sensor from the housing.

10. An electric position sensor as recited in claim 9, a pair of said ridges being formed adjacent each end of the apertures, individual ridges being spaced to form first channels therebetween, said strips additionally comprising second channels extending from said apertures along the aperture axes intersecting said first channels, said channels thereby serving to locate and dress the switch energizing means.

11. An electric position sensor as recited in claim 10, wherein said strip portion lying between said pairs of ridges and surrounding said apertures is thicker than the switches disposed in the apertures to thereby protect the switches during manufacture.

References Cited

UNITED STATES PATENTS

| | | | |
|---|---|---|---|
| 2,289,202 | 7/1942 | McCoy | 73—313 |
| 2,685,797 | 8/1954 | Morschel | 73—313 |
| 2,976,378 | 3/1961 | Goddard | 200—84.3 X |

(Other references on following page)

UNITED STATES PATENTS

| | | | |
|---|---|---|---|
| 3,106,693 | 10/1963 | De Giers | 338—33 |
| 3,179,634 | 4/1965 | Edwards. | |
| 3,215,574 | 11/1965 | Korb | 29—625 X |
| 3,215,903 | 11/1965 | Barney | 335—306 X |
| 3,252,206 | 5/1966 | Stevens. | |
| 3,254,188 | 5/1966 | Lohs. | |

LOUIS R. PRINCE, Primary Examiner

DANIEL M. YASICH, Assistant Examiner

U.S. Cl. X.R.

73—314; 174—52; 200—84